United States Patent [19]

Cross et al.

[11] Patent Number: 4,994,672
[45] Date of Patent: Feb. 19, 1991

[54] PYRO-OPTIC DETECTOR AND IMAGER

[75] Inventors: Leslie E. Cross; Amar S. Bhalla, both of State College, Pa.; Frank Ainger, Brockhall, United Kingdom; Dragan Damjanovic, State College, Pa.

[73] Assignee: Pennsylvania Research Corp., University Park, Pa.

[21] Appl. No.: 410,182

[22] Filed: Sep. 20, 1989

[51] Int. Cl.⁵ ........................... G01J 5/00; G02F 1/00
[52] U.S. Cl. .................................... 250/330; 250/332
[58] Field of Search .................... 250/330, 332, 338.2, 250/338.3, 331

[56] References Cited

U.S. PATENT DOCUMENTS

| | | | |
|---|---|---|---|
| 3,153,146 | 10/1964 | Lady | 250/330 |
| 3,397,313 | 8/1968 | Mast | 250/330 |
| 3,479,510 | 11/1969 | Baumberger et al. | 250/330 |
| 3,603,794 | 9/1971 | Mast | 250/330 |
| 4,160,907 | 7/1979 | Bly | 250/330 |
| 4,262,198 | 4/1981 | Gupta et al. | 250/340 |
| 4,680,723 | 7/1987 | Whinray et al. | 364/571 |
| 4,751,387 | 6/1988 | Robillard | 250/331 |
| 4,788,428 | 11/1988 | Metcalf et al. | 250/332 |
| 4,795,904 | 1/1989 | Richards | 250/332 |
| 4,866,275 | 9/1989 | Jaeger et al. | 250/330 |

FOREIGN PATENT DOCUMENTS 2150387 6/1985 United Kingdom .

OTHER PUBLICATIONS

Lamourouk et al., "Signal-to-Noise Ratio Analysis of a Digital Polarimeter Application to Thermal Imaging", Review of Sci. Inst. 54(5), 1983, pp. 582–585.
Andre et al., "Infrared Video Camera at 10 Microns", Applied Optics, vol. 18, No. 15, Aug. 1979, pp. 2607–2608.

Primary Examiner—Constantine Hannaher
Assistant Examiner—Edward J. Glick
Attorney, Agent, or Firm—Perman & Green

[57] ABSTRACT

An infrared imaging system is described which includes a pyro-optic sensor for receiving a thermal image on one of its sides, the sensor exhibiting a substantial change in refractive index in responses to changes in its temperature. A light beam is projected onto a second side of the sensor, the beam being selectively, locally reflected by the sensor in accordance with local changes in its refractive index. A receiver detects the reflected beam and responds to the reflectance changes to derive a visible image of the thermal image.

The pyro-optic sensor comprises a sandwich structure which includes a film of energy absorbant material upon which the thermal image is received; a thin film of thermal-optic material; and a supporting layer which includes an optically transparent foam positioned next to the pyro-optic material on the side at which is directed an interrogating light beam.

8 Claims, 2 Drawing Sheets

PYRO-OPTIC DETECTOR AND IMAGER

FIELD OF THE INVENTION

This invention relates to a thermal imaging system and more particularly to a thermal imaging system which employs a pyro-optic detector whose refractive index is altered in accordance with local temperature variations therein.

BACKGROUND OF THE INVENTION

There are many types of infrared thermal imaging systems in the prior art. The most widely used classes of infrared imagers employ photon detection and thermal detection. In the latter category, i.e. thermal detectors, the pyro-electric effect present in certain materials is employed as the primary detection means. While the pyro-electric capabilities of materials are often very good, and can achieve a noise equivalent temperature differences of less than 0.01 K, few detectors can approach that performance and still remain both commercially and practically usable. The main problems lie in electrical and thermal isolation of the sensor, electrical contacts to the readout, and the limiting of noise bandwidth which, together, all act to degrade the detector's response in an assembly or array of detectors.

As an example, many thermal detectors employ thin liquid crystals as the heat sensing medium. It is particularly difficult to temperature stabilize the liquid crystal media, as the electrical contacts thereto act as heat sinks and tend to dissipate the accumulated energy, thus decreasing the sensitivity of the system.

Others have attempted to avoid the heat dissipation problem by employing liquid crystal detection units in a light transmission arrangement. In specific, an infrared image is focussed on a liquid crystal detector which, in response to local temperature variations in the crystal medium, accordingly alters its local index of refraction. Subsequently, a polarized light beam is transmitted through the liquid crystal medium which interacts with the polarized light to locally alter the angle of polarization in accordance with the local changes in index of refraction. These changes are detected after the beam exits from the liquid crystal and enable the image to be reproduced. Transmission detection systems require reasonably thick liquid cells which exhibit both low thermal efficiency and significant crystalline noise. Such systems are described by B. F. Lamouroux et al. in "Signal-to-Noise Ratio Analysis of a Digital Polarimeter Application to Thermal Imaging", Review of Scientific Instruments, 54 (5), May 1983 pages 582–585; in "Infrared Video Camera at 10 Microns", Andre et al. Applied Optics Vol. 18, No. 15, Aug. 1979 pages 2607–2608, and in British published patent application GB 2 150 387 A, to Elliot et al. entitled "Thermal Imager".

In U.S. Pat. No. 4,160,907 to Bly, an infrared imager is described wherein a thin semiconducting film, such as vitreous selenium is employed as the infrared detector. This detector exhibits a temperature-dependent optical absorption spectrum which results in local areas on the detector varying in transmissivity in relation to radiation incident thereon. Detection of the infrared radiation is accomplished by transmitting light through the detector and sensing, on the other side thereof, local changes in the intensity of the transmitted light as an indication of the infrared image. This systems suffers a decrease in sensitivity due to the loss of brightness which occurs as the result of having to sense the light, after its passage through the absorption medium.

Accordingly, it is an object of this invention to provide a pyro-optic detector wherein the use of electrical contacts to the pyro-optic element are avoided.

It is another object of this invention to provide a pyro-optic detector wherein the detection element exhibits high thermal efficiency.

It is still another object of this invention to provide a pyro-optic detector which employs a detection material exhibiting a high temperature coefficient of refractive index.

Yet another object of this invention is to provide a pyro-optic detector which avoids losses inherent in transmission imaging systems.

SUMMARY OF THE INVENTION

An infrared imaging system is described which includes a pyro-optic sensor for receiving a thermal image on one of its sides, the sensor exhibiting a substantial change in refractive index in responses to changes in its temperature. A light beam is projected onto a second side of the sensor, the beam being selectively, locally reflected by the sensor in accordance with local changes in its refractive index. A receiver detects the reflected beam and responds to the reflectance changes to derive a visible image of the thermal image.

The pyro-optic sensor comprises a sandwich structure which includes a film of energy absorbant material upon which the thermal image is received; a thin film of pyro-optic material; and a supporting layer which includes an optically transparent foam positioned next to the pyro-optic material on the side at which is directed an interrogating light beam.

DETAILED DESCRIPTION OF THE INVENTION

Figure 1:
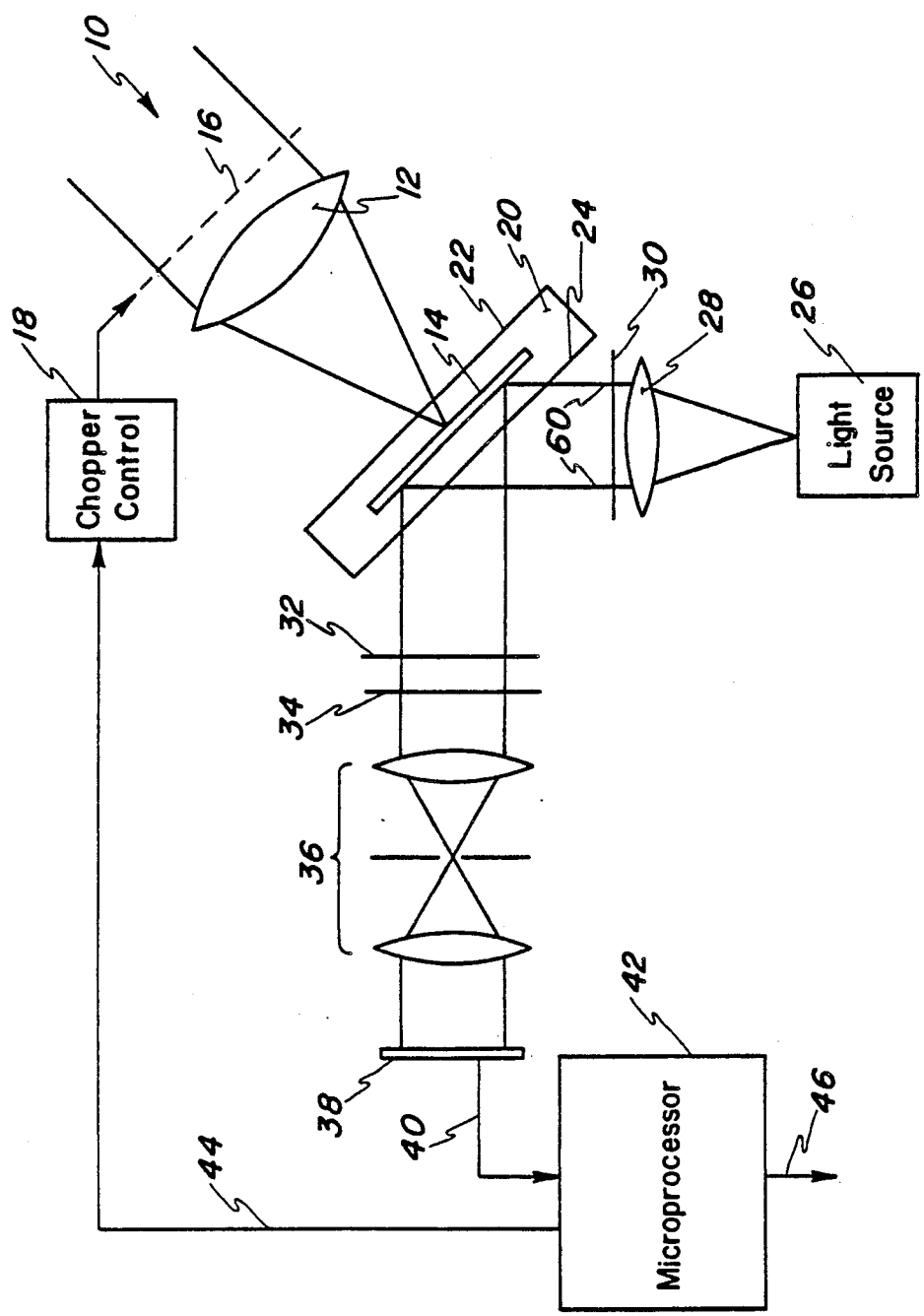
FIG. 1 is a block diagram of a system embodying the invention.

Referring to FIG. 1, an infrared scene 10 is imaged by lens 12 onto pyro-optic detector 14. A chopper 16 periodically interrupts the infrared scene, under control of chopper control 18. Pyro-optic detector 14 is housed within a constant temperature enclosure 20 whose sides 22 and 24 are transparent to electromagnetic radiation.

A light source 26 is directed via lens 28 through polarizing plate 30. The thus polarized light beam then impinges upon one side of pyro-optic detector 14, is reflected thereby and passes through phase plate 32 and polarization analyzer 34. The beam is then imaged by optical system 36 onto a charge coupled device (CCD) array 38, or any other device which is suitable for translating the photonic image into an electrical image. The pixel image from CCD array 38 is then fed via conductor 40 to miroprocessor 42 which assembles the image for display. Microprocessor 42 also, via conductor 44, synchronizes the operation of chopper control 18. This synchronization enables microprocessor 42 to substractively process images to eliminate from the image both fixed pattern and time constant noise. This operation will be discussed in detail below. The output from microprocessor 42 is a video signal on line 46 which then may be viewed or further processed.

Figure 2:
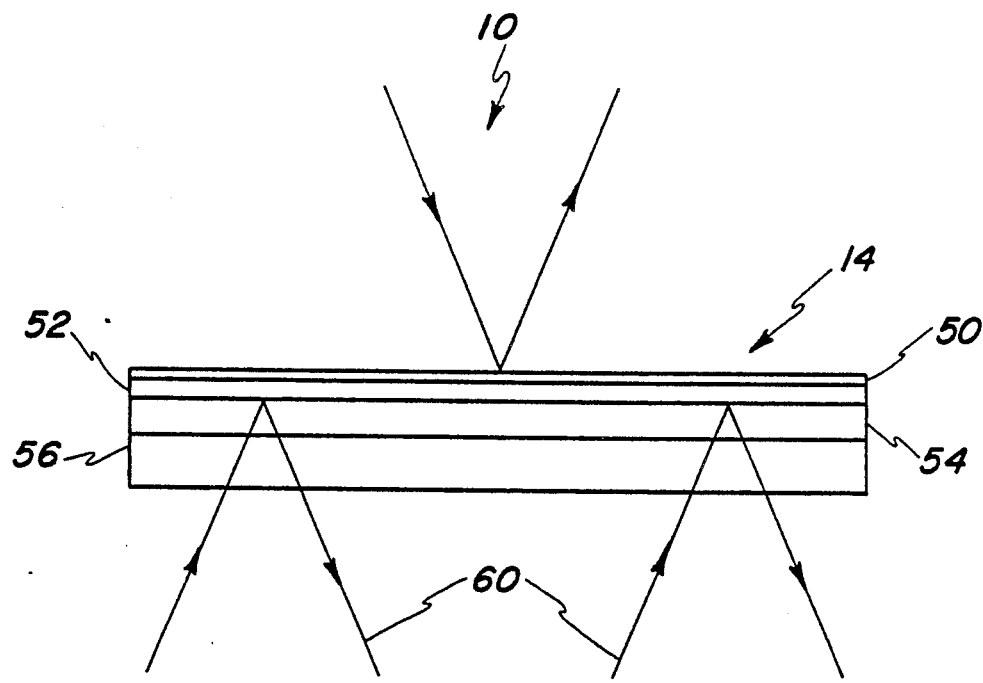
FIG. 2 is a section view of the pyro optic detector.

Referring now to FIG. 2, pyro-optic detector 14 is shown in section. Infrared image 10 is focussed onto an absorbing black layer 50. A pyro-optic film 52 is sandwiched immediately below and in intimate contact with absorbing black layer 50 and has its temperature modified in accordance with temperature variations appearing on black layer 50 (as a result of the projection of infrared scene 10). An optically transparent, thermal isolating layer 54 supports pyro-optic film 52 and provides for the thermal isolation thereof. Layer 56 is an optically transparent glass, quartz or other material which is suitable for providing physical support and temperature isolation of pyro-optic film 52.

The interrogating, polarized light beam 60 from light source 26 (FIG. impinges upon optically transparent layers 56 and 54 and is reflected by pyro-optic layer 52. It is the change in angle of polarization of light beam 60 resulting from this reflection which enables the thermal image on pyro-optic film 52 to be read.

Film 52 is preferably a material which can be formed as a thin film and exhibits large temperature coefficients of refractive index and birefringence. A variety of ferroic materials, ferroelectrics, ferroelastics and ferroelectric/ferroelastics meet this criteria. Table 1 below illustrates certain materials which exhibit a particularly large temperature coefficient of refractive index (n). It is seen from Table I that highly anisotropic materials posses high coefficients. For instance, antimony sulfur iodide and molybdenum disulfide are particularly useful in the temperature regions of 0° C.-50° C. These materials along with certain organico naphtha and related substitutes are preferred materials for pyro-optic film 52.

TABLE I

| MATERIAL | TEMPERATURE RANGE (°C.) | $\frac{d(\Delta n)}{dT}$ (1° C.) | |
|---|---|---|---|
| SbSI | 0° C. to 15° C. | $dn_c/dT =$ | $7.5 \times 10^{-3}$ |
|  | 18° C. | $\geq$ | $15 \times 10^{-3}$ |
| BiVO$_4$ | 20° C. to 100° C. |  | $2.8 \times 10^{-4}$ |
| MoS$_2$ | 20° C. to 50° C. | $dn/dT =$ | $163 \times 10^{-4}$ |
| PbTiO$_3$ | −60° C. to −40° C. |  | $1.5 \times 10^{-4}$ |
|  | −60° C. to 0° C. | ($\lambda = 5150A$) | $1.6 \times 10^{-4}$ |
| BaTiO$_{33}$ | 20° C. to 120° C. |  | $3.1 \times 10^{-4}$ |
| DSP | −40° C. to 0° C. |  | $2.5 \times 10^{-5}$ |
| Fe—I Boracite | 25° C. to 70° C. |  | $3.3 \times 10^{-5}$ |
| Cu—Cl Boracite | 80° C. to 90° C. |  | $4.0 \times 10^{-5}$ |
| TGS | 40° C. to 300° C. |  | $3.3 \times 10^{-5}$ |
| SBN (61:39) | 20° C. to 80° C. |  | $4.5 \times 10^{-4}$ |
| PBZT | 120° C. to 130° C. |  | $5.0 \times 10^{-4}$ |

Thermal isolating layer 54 is included to reduce thermal flow away from pyro-optic film 52. Aerogel, a critically dehydrated foam of silica is preferred for this purpose and is extremely effective in preventing convection losses while, at the same time, being transparent to optical radiation. Aerogel may be obtained from various suppliers or can be prepared in the laboratory (e.g., see "Ambient Temperature Supercritical Drying of Transparent Silica Aerogels", Tewari et al., Materials Letters, Vol. 3, Nos. 9, 10, pp. 363–367 (1985)).

In lieu of an aerogel film, other anodically deposited films on glass, which are thermally isolating, may also be substituted.

Figure 3:
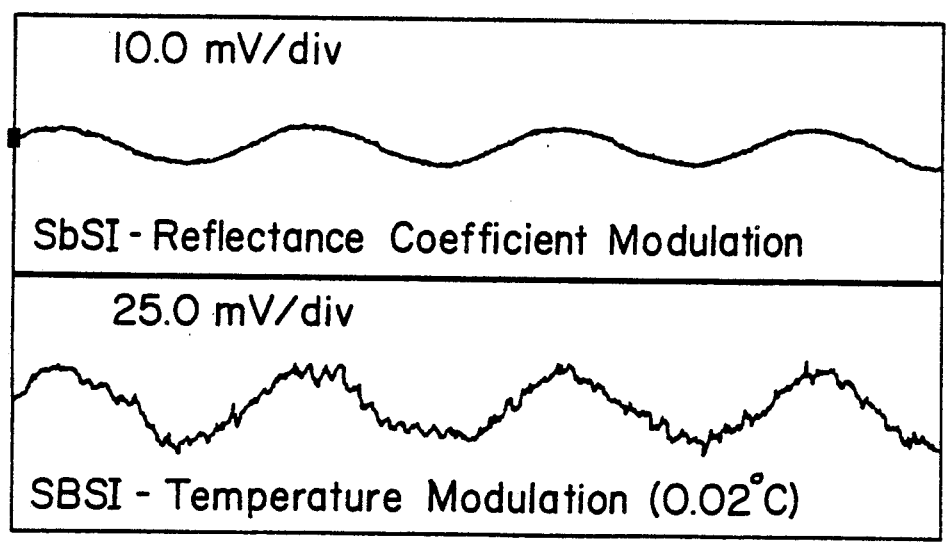
FIG. 3 is a plot of changes in reflectance coefficient in an SbSI sample when it is temperature modulated.

As shown in both Table I and FIG. 3, antimony sulfur iodide exhibits a substantial temperature coefficient of refractive index. FIG. 3 illustrates the alterations in the reflectance coefficient of an antimony sulfur iodide (SbSI) sample in accordance with a 0.02° C. temperature modulation at 3.7 Hz. The optical properties of SbSI are known to be strongly coupled to its polar nature and the presence of a relatively high concentration of non-equilibrium electrons near the phase transition temperature. SbSI may also be deposited in extremely thin, continuous films. The Responsivity of an SbSI film (and all other thermal detecting films) can be expressed as follows:

$$R = \frac{I_o}{(g^2 + w^2c^2t^2)^{\frac{1}{2}}}$$

For an idealized system with optimized optics and absorption of radiation where $I_o$ = energy contrast in thermal scene ($\sim 10^{-4}$ W cm$^{-2}$)
g = thermal conductivity of pyro-optic
c = specific heat of pyro-optic
t = thickness of pyro-optic
w = $2\pi f$ (f = frequency)

As can be seen from the above relationship, assuming that an optimum pyro-optic material is chosen, its specific heat is fixed and varies very little across a diverse range of materials. The most significant impact on Responsivity is made by reducing g and t. Thus by reducing the thickness of pyro-optic film 52 to a minimum, the responsivity of the system can be increased. The film's thermal conductivity is minimized by the placement of an aerogel layer 54 immediately below film 52. Aerogel exhibits a very low g—approximately $10^{-5}$ W/cm/K. Pyro-optic film thicknesses as low as 0.1 microns are preferred.

The operation of pyro-optic detector 14 in FIG. 2 results from localized temperature differences on pyro-optic film 52 causing localized changes in refractive index. When polarized light beam 60 impinges thereon, the beam's angle of polarization is rotated in accordance with the degree of change of the index of refraction at each of the local areas within film 52. It is to be noted that the optical interrogation system which converts the temperature differences to optical differences is an entirely reflective system and does not involve any passage of the interrogating beam through the pyro-optic material. Furthermore, the pyro-optic film 52, by virtue of its extreme thinness, enables substantial thermal sensitivity and attendant low thermal mass.

Referring now to FIGS. 1 and 2 in conjunction, the operation of the invention will be described. As aforestated, an infrared scene 10 is imaged upon pyro-optic detector 14 causing localized changes in the temperature of pyro-optic film 52 and attendant localized changes in its index of refraction. Light beam 60, which is polarized in one direction by virtue of its passage through polarizing plate 30, is reflected by pyro-optic film 52. As above stated, localized areas of beam 60 experience changes in angle of polarization in accordance with the localized changes in index of refraction. The reflected, interrogating beam 60 passes through phase plate 32 and orthogonally oriented polarizing analyzer 34. In the well known fashion, analyzer 34 passes only those areas of polarization which have been rotated from the othogonal polarization orientation. The scene is then imaged by optical system 36 onto CCD array 38 which is periodically read via line 40 into microprocessor 42. Within microprocessor 42 an image subtraction process takes place. The scene imaged on CCD detector 38 when chopper 16 obstructs the infrared scene is subtracted from the infrared scene which is viewed when chopper 16 does not obstructing the view. This enables the subtraction from the image of fixed pattern and transient noise. The thus processed image is then passed to a display via conductor 46.

As will be understood by those skilled in the art, the basic interrogation technique utilized herein is similar to ellipsometric methods. Phase plate 32 is employed to adjust the reflected beam at analyzer 34 so that a null occurs when pyro-optic detector 14 is at its nominal, non-imaging condition. Enclosure 20 is preferably temperature controlled to provide pyro-optic detector 14 with a constant ambient, which ambient does not differ significantly from the temperature range being detected. Light source 26 may either be an uncollimated light source or may be a source of collimated light (e.g. a laser) whose beam is scanned over the surface of pyro-optic detector 14. In such case, the scan rate of light source 26 will be synchronized with the operation of microprocessor 42.

It should be understood that the foregoing description is only illustrative of the invention. Various alternatives and modifications can be devised by those skilled in the art without departing from the invention. Accordingly, the present invention is intended to embrace all such alternatives, modification and variances which fall within the scope of the appended claims.

We claim:

1. An infrared imaging system comprising:
   pyro-optic sensing means including a multilayer, planar sandwich structure comprising a film of energy absorbent material, a thin film of pyro-optic material selected from the group consisting of SbSI BiVO$_4$ and MoS$_2$, and a supporting thermally insulating layer transparent to an interrogating light beam, for receiving a thermal image on said energy absorbent material, said pyro-optic material exhibiting a change in its refractive index in response to changes in its temperature;
   means for directing an interrogating optical beam onto said pyro-optic material, said optical beam being reflected and selectively altered by said pyro-optic material in accordance with local changes in tis refractive index; and means for receiving said reflected beam and responding to said selective reflectance alterations to derive a visible image of said thermal image.

2. The imaging system of claim 1 wherein said supporting thermally insulating layer comprises:
   an optically transparent foam layer of low thermal conductivity, adjacent said thin film of pyro-optic material.

3. The imaging system of claim 2 wherein said transparent foam layer is silica aerogel.

4. The imaging system of claim 2 further comprising:
   container means for enclosing said pyro-optic sensing means and maintaining it at a stable temperature.

5. The imaging system of claim 1 wherein said directing means includes a first polarizer for polarizing said interrogating optical beam in a first direction.

6. The imaging system as recited in claim 5 wherein said receiving means includes a second polarizer whose direction of polarization is orthogonal to said first direction after reflection of said optical beam, portions of said reflected beam exhibiting local rotated angles of polarization from said first direction depending upon said local changes in refractive index of said pyro-optic sensing means, whereby said local rotated reflected optical beam portions are subjected to lesser attenuation by said second polarizer than said nonrotated portions.

7. The imaging system of claim 6 further comprising:
   chopper means for periodically blocking the pyro-optic sensor means from receiving the thermal image; and
   means in said receiving means for subtracting the image derived when said thermal image is blocked by said chopper means from a thermal image derived when said pyro-optic sensor means is not blocked by said chopper means;
   whereby fixed pattern and system noise is cancelled from the image.

8. A pyro-optic sensor for use in an infrared imaging system having an interrogating optical beam, said sensor comprising:
   a thin film of pyro-optic material selected from the group consisting of SbSI, BiVO$_4$ and MoS$_2$, having two major surfaces, said material reflective of said interrogating optical beam;
   a glassy support plate;
   a low thermal conductivity optically transparent aerogel foam disposed between a major surface of said film, and said glassy plate; and
   a layer of infrared absorbent material disposed on another major surface of said film of pyro-optic material.

* * * * *